(12) United States Patent
Shimmin

(10) Patent No.: US 11,465,819 B2
(45) Date of Patent: Oct. 11, 2022

(54) CABLE TIE

(71) Applicant: Tony Richard Shimmin, Clarckson (AU)

(72) Inventor: Tony Richard Shimmin, Clarckson (AU)

(*) Notice: Subject to any disclaimer, the term of this patent is extended or adjusted under 35 U.S.C. 154(b) by 0 days.

(21) Appl. No.: 17/288,952

(22) PCT Filed: Oct. 25, 2019

(86) PCT No.: PCT/AU2019/051176
§ 371 (c)(1),
(2) Date: Apr. 27, 2021

(87) PCT Pub. No.: WO2020/087109
PCT Pub. Date: May 7, 2020

(65) Prior Publication Data
US 2021/0394982 A1    Dec. 23, 2021

(30) Foreign Application Priority Data

Nov. 1, 2018  (AU) .................... 2018904167

(51) Int. Cl.
*B65D 63/10*     (2006.01)

(52) U.S. Cl.
CPC .... *B65D 63/1072* (2013.01); *B65D 2563/107* (2013.01)

(58) Field of Classification Search
CPC .................. B65D 63/1072; B65D 2563/107
See application file for complete search history.

(56) References Cited

U.S. PATENT DOCUMENTS

| | | | |
|---|---|---|---|
| 4,008,512 A | 2/1977 | Prodel | |
| 5,901,416 A | 5/1999 | Mears | |
| 7,281,302 B2 * | 10/2007 | Hewes | B65D 63/1063 24/16 PB |
| 8,056,192 B1 * | 11/2011 | Posner | F16L 33/035 24/272 |
| 9,526,869 B2 * | 12/2016 | Beran | A61M 25/02 |
| 2015/0321814 A1 | 11/2015 | Rodrigues Pereira | |

FOREIGN PATENT DOCUMENTS

GB    2327455 A    1/1999

* cited by examiner

*Primary Examiner* — David M Upchurch
(74) *Attorney, Agent, or Firm* — Anderson Gorecki LLP

(57) ABSTRACT

There is disclosed a releasable cable tie having an elongated flexible strap provided with a plurality of strap teeth and with a locking head disposed at one end of the strap. The locking head defines a passage therethrough wherein there is located a resiliently movable pawl being configured to engage with the strap teeth when the strap is inserted through the passage. The locking head has a first leg joined to the strap and a second leg being pivotally movably joined to the first leg at a hinge. The locking head can be selectively disposed between an open position and a closed position. In its closed position the second leg butts against the first leg to define the passage, whereas in its open position the second leg is spaced away from the first leg to provide a side opening into the passage.

14 Claims, 3 Drawing Sheets

Figure 4
Figure 5
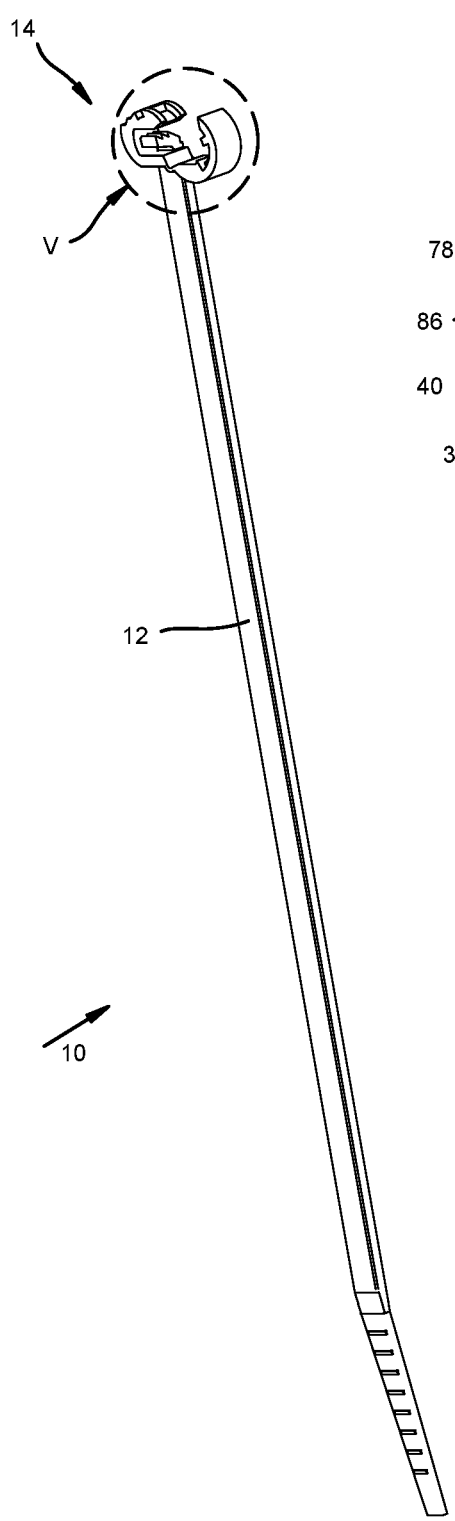
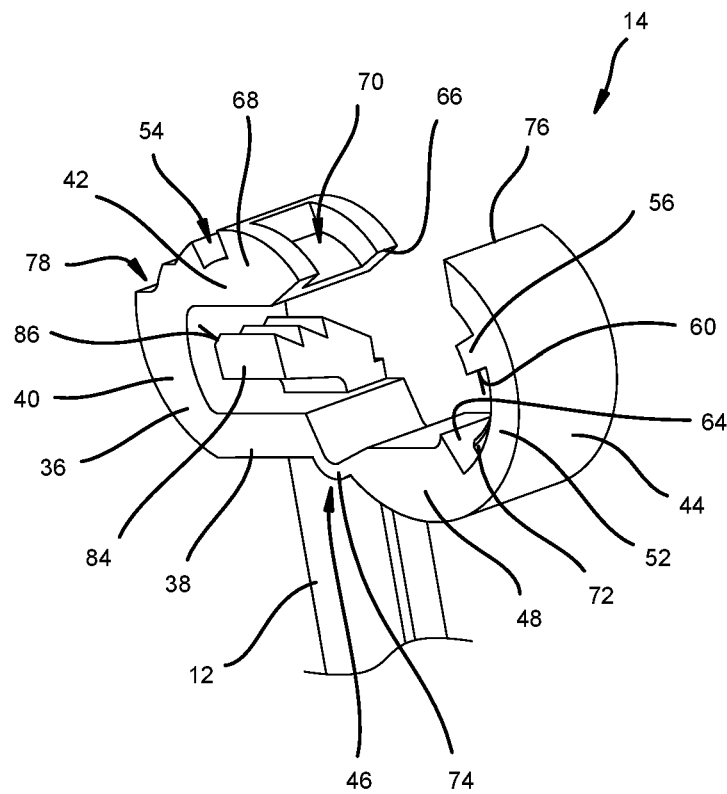

CABLE TIE

TECHNICAL FIELD

The present disclosure relates to a fastening device commonly known as a cable tie.

More particularly, the present disclosure relates to a cable tie having a releasable locking head that enables the cable tie to be reused.

BACKGROUND

Cable ties (also sometimes referred to as zip ties) are a type of fastening device for holding or tying wires and cables together. Cable ties are normally made by injection moulding from plastics material and are thus a relatively cheap item. Due to their low cost, the use of cable ties has become more general and they are now also widely used as throw-away fasteners to attach items to structural supports, for example attaching posters to fences, suspending shade cloth or safety netting to construction scaffolding and attaching product labels to articles.

A conventional cable tie has an elongated flexible strap with a row of teeth provided along the length of the strap forming a gear rack. At one end of the strap is a locking head that defines a passage wherein is located a pawl. When the free end of the strap is looped around a bundle of articles and passed through the passage, the pawl engages with the teeth in a ratchet to prevent the strap from being withdrawn from the head, i.e. the free end can be pulled through the head in one direction only wherein the loop is tightened.

In normal household usage, the cable ties are simply tightened by gripping the free end and manually pulling the strap through the ratchet in the head. For commercial or industrial use, there are also cable tie tightening tools that both suitably tension and sever the loose end of the strap.

Conventional cable ties are generally viewed as single use devices and are typically released by cutting through the strap, thereby destroying the cable tie, whereafter the cable tie is discarded. However, with difficulty, it is possible to release such conventional cable ties by pressing a sharp object (such as a needle, blade or small screwdriver) into the passage in the head to disengage the pawl from the teeth thereby to allow the strap to be withdrawn from the head.

With the aim of becoming more environment friendly and to make cable ties more readily reusable, some cable ties have been developed to include a tab extending from the pawl and projecting out of the passage in the head. The tab projects for a length sufficient for it to be more easily manipulated to release the ratchet and allow the strap to be partially or fully withdrawn from the head. An example of such a cable tie is shown in patent U.S. Pat. No. 3,991,444. However, this projecting tab can cause a hinderance in using standard cable tie tightening tools as the tools cannot be correctly located adjacent to or over the head of the cable tie. One method of overcoming this problem is disclosed in patent U.S. Pat. No. 5,193,250 whereby a base wall of the head is enlarged to an extent equal to or greater than the length of the projecting tab—this allows the cable tie tightening tool to abut against the enlarged base wall while also allowing the projecting tab to be accessed from a side of the head opposite to the base wall. Another method of overcoming the problem is to reorientate the projecting tab so that it extends perpendicularly away from the strap, such as is disclosed in patent U.S. Pat. No. 6,185,791.

It is to be understood that, if any prior art publication is referred to herein, such reference does not constitute an admission that the publication forms a part of the common general knowledge in the art, in Australia or any other country.

SUMMARY OF THE DISCLOSURE

According to a first aspect of the disclosure, there is provided a cable tie comprising
- an elongated flexible strap having opposed first and second ends, the strap further having opposed major surfaces with a plurality of strap teeth provided along at least one of the major surfaces;
- a tail disposed at the first end of the strap;
- a locking head disposed at the second end of the strap, the locking head defining a passage therethrough wherein there is located a resiliently movable pawl being configured to engage with the strap teeth when the strap is inserted through the passage, the locking head being configured to be selectively disposed between an open position and a closed position, wherein the locking head comprises
   - a first leg joined to the strap,
   - a second leg being pivotally movably joined to the first leg at a hinge, wherein the locking head is disposed in its closed position when the second leg butts against the first leg to define the passage, and wherein the locking head is disposed in its open position when the second leg is spaced away from the first leg to provide a side opening into the passage, and
   - a latching mechanism provided near a free end of the second leg, the latching mechanism being configured to releasably latch the second leg to the first leg.

The second leg may define a substantially planar seat against which the first leg abuts when the locking head is disposed in its closed position. The seat may be orientated to be perpendicular or obtusely angled relative to a direction of rotation that the second leg will rotate around the hinge towards the locking head's open position. The seat may be enlarged and extends partially into the passage when locking head is disposed in its closed position.

In one embodiment a part of the fixed leg is configured to be confined between the latching mechanism and the seat.

The latching mechanism may include a latching arm extending from the second leg, the latching arm being configured to at least partially wrap around an outside of the first leg. In one embodiment the latching arm is configured to terminate flush with the first leg. In such case, to assist a person in releasing the latching arm during use, the locking head may comprise a notch in the fixed leg, which notch is configured to extend around and partially beneath a terminal end of the latching arm thereby in use enabling a person to lift the latching arm away from the first leg, e.g. such as by inserting their fingernail into the notch to engage the terminal end of the latching arm.

The latching mechanism may include a catch provided on the first leg and a latch provided on the latching arm, the catch and latch engaging along a latching engagement interface. The catch may be a slot extending transversely across an outer side of the first leg and the latch comprises a lug projecting inwardly from the latching arm, wherein the lug is configured to be received within the slot. The latching engagement interface may extend along a plane that is orientated to be perpendicular or acutely angled relative to a direction of rotation that the second leg will rotate around the hinge towards the open position.

The locking head may include an engagement formation being configured to limit any lateral sliding movement of the latching arm in the direction transverse to the hinge when locking head is disposed in its closed position. The engagement formation may include a recess in fixed leg and a peg extending from the latching arm for being received in the recess. The peg may have chamfered sides to assist the peg moving into the recess when the second leg is moved to close the locking head.

The strap may have opposed elongated rails bordering the strap teeth wherein at least one of the rails is chamfered inwardly towards the strap teeth. In such case the pawl may have a congruent chamfer to that of the chamfered rails.

BRIEF DESCRIPTION OF DRAWINGS

The above and other features will become more apparent from the following description with reference to the accompanying schematic drawings given as an example. The drawings are for the purpose of illustration only and are not intended to be in any way limiting, wherein:

FIG. 4 is a further perspective view of the cable tie seen from its outer side and shown with its locking head in its open position;

FIG. 5 is an enlarged perspective view of the area indicated by arrow V in FIG. 4 showing the locking head in greater detail;

DETAILED DESCRIPTION

Figure 1:
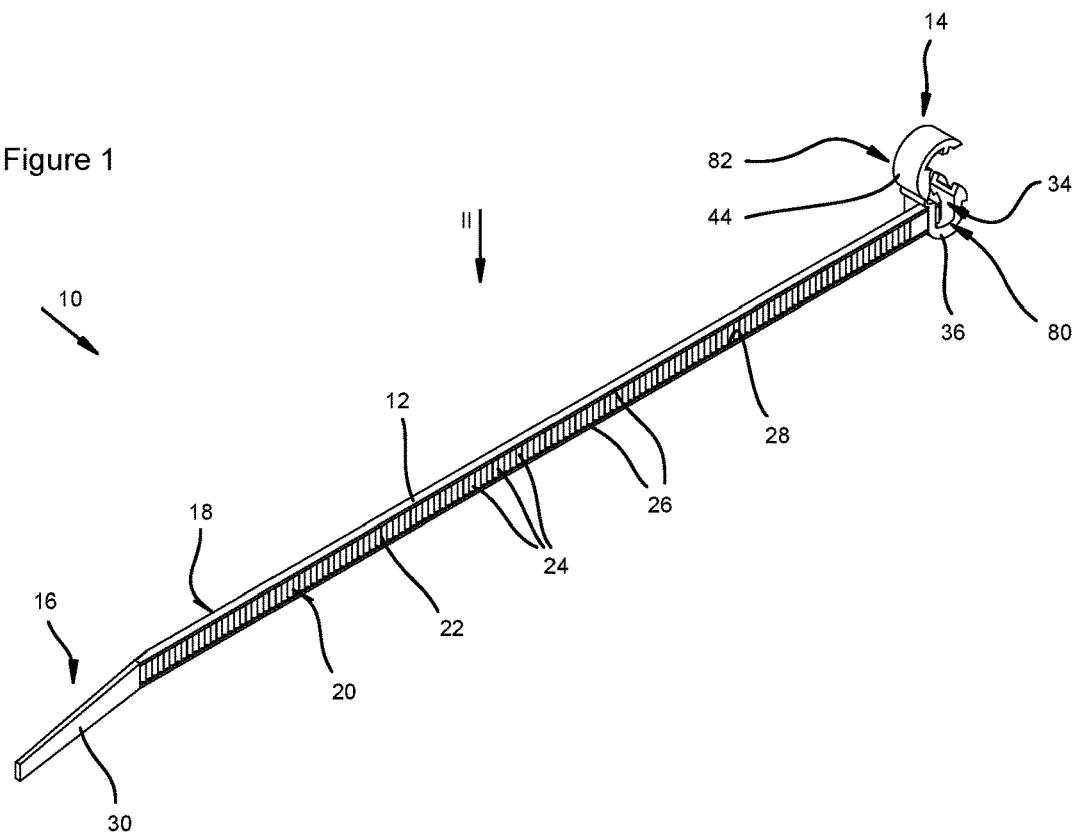
FIG. 1 is a perspective view of a cable tie seen from its inner side and shown with its locking head in an open position.
Figure 2:
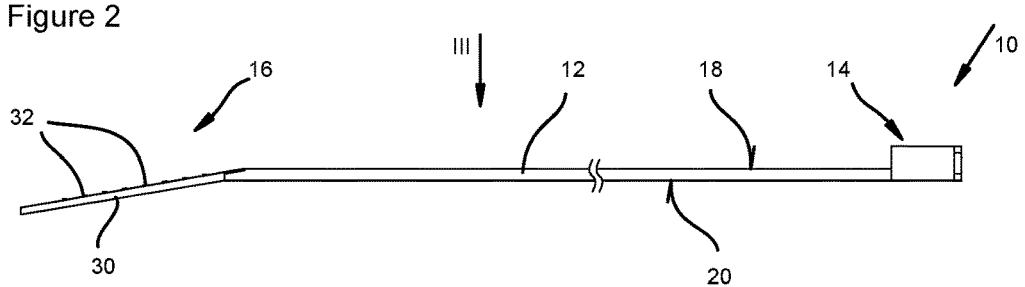
FIG. 2 is a side view of the cable tie seen along arrow II in FIG. 1.
Figure 3:
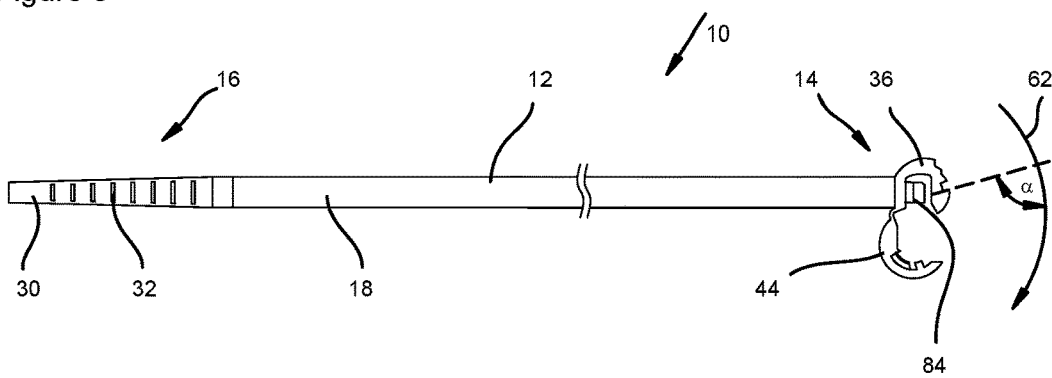
FIG. 3 is a lateral view of the cable tie seen along arrow III in FIG. 2.
Figure 6:
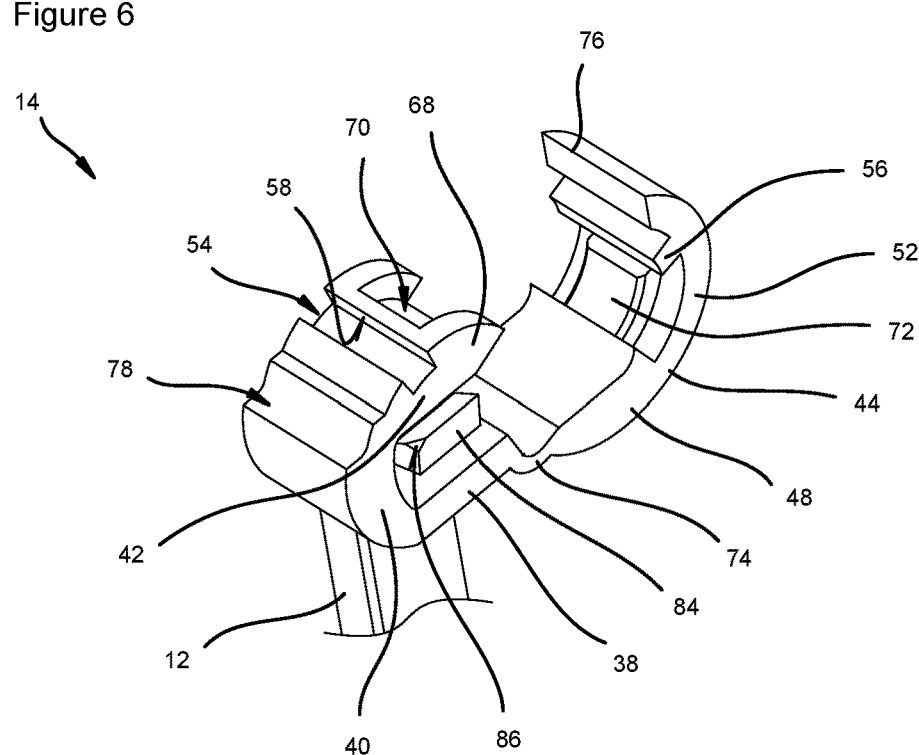
FIG. 6 shows the locking head of FIG. 5 but seen from an alternate perspective angle.

Referring to the drawings there is shown a cable tie 10 comprising an elongated flexible strap 12 having opposed first and second ends, wherein a locking head 14 is integrally formed at one end thereof and having an opposed free end 16. The cable tie 10 is integrally moulded from a suitable plastics material, for example such as a polyamide synthetic polymer, so that during use it has sufficient strength and resilience to allow the strap 12 to be bent into a loop for free end 16 to be inserted and secured within the locking head 14, thereby enabling the cable tie 10 to hold together or be joined to one or more articles.

The strap 12 is in the form of an elongated flat web having respective first and second major surfaces 18, 20 and is formed in any requisite length to form a loop of a desired size. The first major surface 18 is arranged to be an outer surface of the strap 12 in normal use, whereas the second major surface 20 is configured to be an inner surface of the strap 12 in normal use. In other words, the first major surface 18, which is substantially flat, is arranged to face outwardly from articles enclosed by the loop of the strap 12 during use. For clarity and ease of understanding the description below will refer to the first major surface 18 as the "outer surface 18" and to the second major surface 20 as the "inner surface 20".

The inner surface 20 has a ratchet rack 22 formed by a plurality of transversely extending strap teeth 24 which are uniformly provided along a major part of the length of the strap 12, i.e. the teeth 24 extend perpendicularly to the longitudinal direction of the strap 12. The teeth 24 are configured to engage with a pawl as will be described in due course. In use, the ratchet rack 22 is orientated to face towards the articles enclosed by the loop of the strap 12. Although having the ratchet rack 22 facing towards the articles can assist in enhancing the grip of the strap 12 around the articles, this orientation is primarily aimed at avoiding the teeth 24 abrasively "sawing" against other objects that rub against the strap 12. However, it should be appreciated that other inverted examples of the cable tie 10 can be provided as easily, wherein the ratchet rack 22 is on the outer surface and the inner surface is smooth—in such case the pawl will merely also need to be inverted so that it is able to suitably engage with the teeth.

The ratchet rack 22 is bounded on its elongated sides by opposed edge rails 26, wherein the rails 26 extend to a height being at least the same as the height of the teeth 24. In the embodiment shown the rails 26 extend up to a height being co-planar with an apex of the teeth 24. In other examples, the rails 26 can extend to a greater height so that they extend beyond the apex of the teeth 24. The rails 26 form a protective barrier on the sides of the ratchet rack 22 and thereby also assist in avoiding the teeth 24 coming into abrasive "sawing" contact with articles abutting against or enclosed by the strap 12. The rails 26 can further assist in properly locating the strap 12 within the locking head 14 as will discussed below. The rails 26 may optionally have an inward chamfer 28 leading towards the ratchet rack 22.

At its free end 16 the strap 12 tapers into a truncated tail 30 having a reduced cross-sectional thickness compared to the strap 12. Instead of being truncated, tail 30 can have a rounded off tip. In the exemplary embodiment the thickness of tail 30 is about 50% of the thickness of the strap 12. In other embodiments the thickness of tail 30 can vary between 40% to 100% of the thickness of the strap 12. A thinner tail 30 provides more leeway when inserting the tail 30 through the locking head 14 but may result in the tail 30 being too flexible so that it cannot be easily gripped and directed towards the locking head 14. Conversely, a thicker tail 30 will be stiffer and can be directed more easily towards the locking head 14 but allows less leeway when inserting the tail 30 through the locking head 14. Tail 30 is angled slightly off-planar relative to the strap 12 and is bent in a direction towards the inner surface 20 so that tail 30 and strap 12 form an enclosed obtuse angle of about 165° to 175°. This slight bend assists a user to insert the tail 30 into the locking head 14.

On the outer surface 18 side of the tail 30 there are a number of spaced apart low-profile ridges 32 extend transversely across the tail 30, i.e. being orientated substantially parallel to the teeth 24. The ridges 32 are equidistantly spaced apart by a distance being equivalent to the width of the locking head 14 so that when the tail 30 is passed through the locking head 14, the locking head 14 will be lightly held between two cooperating ridges 32. It will be appreciated that in some examples the ridges 32 can be spaced closer to each other, in which case the ridges are provided in cooperating pairs arranged to hold the locking head 14. For example, the ridges 32 can be spaced at distances of about 50% of the width of the locking head 14, in which case the locking head 14 will be held between two ridges 32 with one intermediate ridge 32 positioned centrally within the locking head 14.

Locking head 14 defines a passage 34 which is arranged to receive strap 12 by inserting and passing free end 16 therethrough. In the depicted embodiment, locking head 14 lies in a "flat" orientation relative to strap 12 so that passage 34 extends perpendicularly to strap 12, i.e. passage 34 extends perpendicularly to outer and inner surfaces 18, 20. In other examples, locking head 14 can be arranged to extend in a perpendicular orientation relative to the strap 12 whereby passage 34 extends parallel to longitudinal direction of strap 12.

Figure 7:
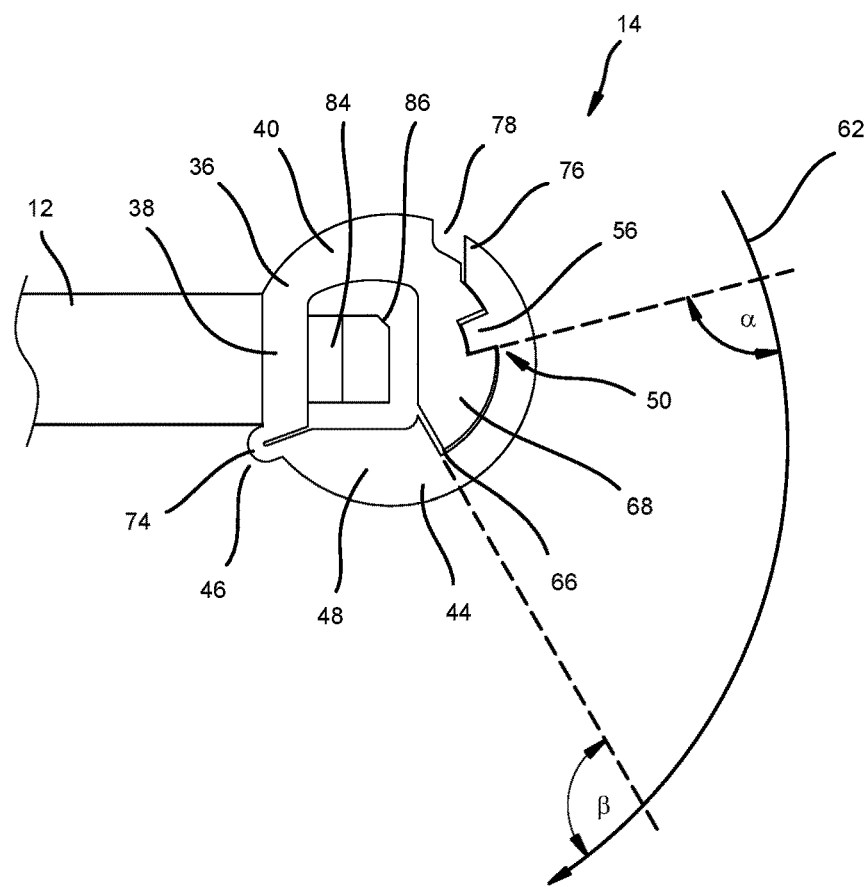
FIG. 7 is a lateral view of the locking head but shown with its locking head in a closed position.

Locking head 14 comprises a fixed leg 36 joined to strap 12 so that it is immovable relative thereto, wherein fixed leg 36 is substantially C-shaped in lateral view being formed by base wall 38, side wall 40 and top wall 42. A movable leg 44 is movably joined to fixed leg 36 at hinge 46 so that movable leg 44 can be selectively pivoted at hinge 46 between an open position and a closed position. Cable tie 10 is shown with movable leg 44 in the open position in FIGS. 1 to 6 and with movable leg in the closed position in FIG. 7. Moveable leg 44 comprises a closing wall 48 being joined to the hinge 46 which is is integrally moulded with both fixed leg 36 and movable leg 44. When in the closed position, fixed leg 36 and movable leg 44 cooperate to define passage 34 extending through locking head 14, wherein passage 34 is then bounded by base wall 38, side wall 40, top wall 42 and closing wall 48. Conversely, when in the open position, movable leg 44 is pivoted to be spaced away fixed leg 36 to provide side opening into the passage 34.

Locking head 14 further has a latching mechanism 50 being configured to releasably latch and secure movable leg 44 to fixed leg 36 in the closed position. Latching mechanism 50 comprises a latching arm 52 extending away from closing wall 48 on an opposed side thereof to hinge 46. Latching arm 52 is configured to wrap at least partially around and the outside of and terminate flush with fixed leg 36. Latching mechanism 50 further comprises a catch, in the form of slot 54 extending transversely across an outer side of the top wall 42 of fixed leg 36, and a latch in the form of rectangular lug 56 projecting inwardly from latching arm 52, wherein lug 56 is configured to be received within slot 54. Slot 54 and lug 56 are complimentary in shape so that in the closed position lug 56 can be snugly received and held within slot 54. It will be appreciated that in alternative embodiments, the features of latching mechanism 50 can be reversed so that the slot would be formed in the latching arm while the lug would project outwardly from the top wall.

Latching mechanism 50 has a latching engagement interface formed by a contacting face 58 and a latching face 60. In this regard, slot 54 has an inner face that lies on the side of slot 54 closest to hinge 46 and that, in use, constitutes the contacting face 58. Similarly, lug 56 has an inner face that lies on the side of lug 56 closest to hinge 46 and that, in use, constitutes the latching face 60. When movable leg 44 is pivoted into the closed position, lug 56 clips and engages into slot 54 so that latching face 60 lies flush against contacting face 58. In this regard it should be appreciated that, due to the resilient material of which cable tie 10 is made, latching arm 52 can flex slightly outwardly to assist lug 56 clipping into slot 54. When in this latched position, contacting face 58 and latching face 60 lie in a plane that is normally perpendicular to a direction of rotation that the movable leg 44 rotates around hinge 46 towards its open position—the direction of rotation is indicated by arrow 62 in FIGS. 3 and 7. In other examples, the contacting face 58 and latching face 60 can be acutely angled relative to the direction of rotation 62 towards the open position. For clarity, it should be appreciated that the direction of rotation 62 will be tangential around hinge 46 and the acute angle is indicated by symbol "α" in FIGS. 3 and 7.

At the transition from closing wall 48 to latching arm 52, closing wall 48 comprises a substantially planar seat 64 projecting inwardly of the latching arm 52. Seat 64 is configured to abut against top wall edge 66 to provide structural support and assist in maintaining the shape of locking head 14 when in the closed position. In one example, seat 64 is orientated to be perpendicular or obtusely angled relative to the direction of rotation 62 (for clarity, the obtuse angle is indicated by symbol "β" in FIG. 7). Accordingly, bulbous part 68 of top wall 42, namely the part thereof located between slot 54 and top wall edge 66 is configured to be confined or trapped between lug 56 and seat 64. Seat 64 can optionally be enlarged by extending it inwardly so that it projects slightly into the passage 34 when cable tie 10 is in the closed position, thereby to increase the stability of locking head 14 in the closed position.

In some instances, having the latching mechanism 50 formed by slot 54 and lug 56 can result in movable leg 44 being prone to experiencing slight lateral sliding movement in the direction of passage 34, which could reduce the stability and latching performance of latching mechanism 50. Such lateral movement can be obviated by providing an engagement formation being configured to at least partially limit any lateral sliding movement in a direction transverse to the hinge 46. In the exemplary embodiment, this engagement formation is provided in the form of a recess 70 being formed within bulbous part 68 on the outside thereof, which recess 70 is arranged to receive and locate rectangular peg 72 extending inwardly from the latching arm 52. In other examples, recess 70 and peg 72 can take any other complementary shapes, e.g. being cylindrical. Yet further, in other embodiments the engagement formation can be provided wherein side wings extend inwardly from latching arm 52 in the opening between the lug 56 and the seat 64. The side wings can extend all the way across the gap between lug 56 and seat 64, but it is also envisaged that optionally the side wings can be smaller and spaced apart from lug 56 and seat 64. In such embodiments, the side wings abut against the opposed lateral sides of bulbous part 68 and thereby prevent lug 56 from undergoing any sliding movement along slot 54.

Hinge 46 includes a bridge member 74 being integrally formed with and extending from base wall 38 to closing wall 48. Bridge member 74 has a cross-sectional thickness being sufficiently thin so that bridge member 74 is flexible and allows movable leg 44 to pivot around hinge 46. Bridge member 74 can have a substantially uniform thickness. In one example, bridge member 74 is shaped to form a circular enclosed space. In other embodiments, hinge 46 can be enlarged so that respective hinge plates extend outwardly from base wall 38 and closing wall 48 and wherein bridge member 74 joins these hinge plates together.

When locking head 14 is in the closed position, distal edge 76 of latching arm 52 lies substantially flush with fixed leg 36 so that distal edge 76 does not project outwardly from locking head 14. This is to prevent distal edge 76 from being accidentally snagged and moving latching arm 52 into the open position. A notch 78 is formed in fixed leg 36, which extends underneath distal edge 76, to enable a person to grip distal edge 76 when intentional opening of locking head 14 is desired such as by inserting a finger nail into notch 78.

Passage 34 has an entry 80 on the inner surface 20 side thereof and an exit 82 on the outer surface 18 side thereof. Locking head 14 includes a resiliently movable toothed pawl 84 located within passage 34 and being joined to base wall 38 near entry 80. In use, pawl 84 is configured to engage with ratchet rack 22 in a ratchet formation that allows forward movement of strap 12 in a direction from entry 80 towards exit 82 but to prevent movement of strap 12 in a reverse movement. It should be understood that pawl 84 operates in conventional manner and that during movement of strap 12 through passage 34, strap 12 slidingly abuts against an inner surface of top wall 42, whereby pawl 84 is repetitively deflected towards base wall 38 as it ratchets over teeth 24 and resiliently returns to its starting position as the pawl teeth engage in the recesses between teeth 24.

In some embodiments, rails 26 of strap 12 extend down the opposed sides of pawl 84. This arrangement assists in properly orientating the strap 12 within passage 34 and in preventing the pawl 84 from being inadvertent disengaged from the ratchet rack 22 if strap 12 twists within passage 34. In embodiments where the rails 26 have the chamfer 28 towards the ratchet rack 22, the pawl 84 will also have a corresponding congruent chamfer 86 on its sides. In some embodiments, such chamfers 28, 86 may only be provided on one side of the pawl 84 and strap 12 that lie closest to the side wall 40.

In use, cable tie 10 is initially arranged with the locking head 14 in its closed position, i.e. with movable leg 44 pivoted towards fixed leg 36 and lug 56 engaged within slot 54. Strap 12 is then formed into a loop around articles to be secured and tail 30, followed by the required extent of strap 12, is inserted through passage 34 from entry 80 so that tail 30 and a portion of strap 12 extend through exit 82. The tapering and thinness of tail 30 assist the initial insertion of tail 30 into entry 80 so that tail 30 can pass through passage 34 without engaging the pawl 84. The ridges 32 on tail 30 prevent the tail from slipping out of passage 34 before it protrudes from exit 82 as these ridges 32 engage with the exit 82 side of locking head 14. Further insertion of strap 12 through passage 34 causes pawl 84 to engage with ratchet rack 22. At this time the opposed rails 26 depend at least partially around pawl 84 so that they are respectively slidingly held between pawl 84 and side wall 40 and also between pawl 84 and closing wall 48. Strap 12 is thus securely slidably held within passage 34 by pawl 84, side wall 40, top wall 42 and closing wall 48 to prevent any lateral or roll, yaw or pitch movement of strap 12 within passage 34. Strap 12 can thus only move longitudinally through passage 34 until it is sufficiently tightened.

When cable tie 10 is to be released, the movable leg 44 is disengaged from and pivoted away from fixed leg 36 into its open position. This is achieved by taking hold of distal edge 76, e.g. by inserting a finger nail into notch 76, and pulling distal edge 76 and latching arm 52 outwardly away from top wall 42. In so doing, top wall 42 will resiliently flex causing lug 56 to clip out of slot 54 and enabling seat 64 to separate from top wall edge 66 so that a side opening is provided into passage 34. Once moveable leg 44 is sufficiently spaced from fixed leg 36, strap 12 can be pushed laterally away from side wall 40 so that it passes sideways through the new opening and out of passage 34.

In some embodiments the sideways movement of strap 12 can be slightly hindered by the inner rail 26 catching on pawl 84. However, after the closing wall is removed, pawl 84 has greater ability to flex sideways away from side wall 40 and downwards towards base wall 38 and thus, with a little bit of wriggling movement it is normally possible to disengage strap 12 from pawl 84. In other embodiments the removal of strap 12 is assisted by the chamfer 28 on the rails 26 and chamfer 86 on the sides of pawl 84 which assist in disengaging strap 12 from pawl 84.

Thereafter strap 12 can be removed from the articles secured by cable tie 10 so that cable tie 10 can be re-used for another purpose. Locking head 14 must merely be returned to its closed position, which is done in the reverse steps—i.e. movable leg 44 is pivoted towards fixed leg 36 until seat 64 abuts against top wall edge 66 and latching arm 52 is folded over top wall 42. By pressing or slightly flexing on latching arm 52, lug 56 clips into slot 54 so that latching face 60 lies against contacting face 58.

The trapping of bulbous part 68 between seat 64 and lug 56 and also between side wings prevents latching arm 52 from easily moving relative to fixed leg 36 and so avoids inadvertent opening of locking head 14.

It will be appreciated by persons skilled in the art that numerous variations and/or modifications may be made to the cable tie as shown in the specific embodiments without departing from the spirit or scope of the disclosure as broadly described. The present embodiments are, therefore, to be considered in all respects as illustrative and not restrictive.

For example, it is envisaged that the fixed leg 36 can also include a hinge provided between side wall 40 and top wall 42 and being arranged to allow top wall 42 to pivot away from pawl 84 and thereby allow the strap to be removed more easily from passage 34. Alternatively, this hinge can be provided between base wall 38 and side wall 40, thereby allowing both side wall 40 and top wall 42 to be pivoted away from pawl 84. This hinge will be of a similar construction as hinge 46.

In the claims which follow and in the preceding description, except where the context requires otherwise due to express language or necessary implication, the word "comprise" or variations such as "comprises" or "comprising" is used in a non-limiting and an inclusive sense, i.e. to specify the presence of the stated features but not to preclude the presence or addition of further features in the various embodiments of the cable tie. A reference to an element by the indefinite article "a" does not exclude the possibility that more than one of the elements is present, unless the context clearly requires that there be one and only one of the elements.

The invention claimed is:
1. A cable tie comprising
   an elongated flexible strap having opposed first and second ends, the strap further having opposed major surfaces with a plurality of strap teeth provided along at least one of the major surfaces;
   a tail disposed at the first end of the strap;
   a locking head disposed at the second end of the strap, the locking head defining a passage therethrough wherein there is located a resiliently movable pawl being configured to engage with the strap teeth when the strap is inserted through the passage, the locking head being configured to be selectively disposed between an open position and a closed position, wherein the locking head comprises
   a first leg joined to the strap,
   a second leg being pivotally movably joined to the first leg at a hinge, the second leg comprising a closing wall being configured to butt against the first leg to define the passage when the locking head is disposed in its closed position, and wherein the closing wall is spaced away from the first leg to provide a side opening into the passage when the locking head is disposed in its open position, and
   the second leg further comprising a latching arm extending from the closing wall and configured to at least partially wrap around an outside of the first leg, with a latching engagement formation provided along the length of the latching arm to releasably latch the second leg to the first leg, and wherein a distal edge of the latching arm does not project outwardly from the first leg when the locking head is disposed in the closed position.

2. A cable tie as claimed in claim 1, wherein the closing wall defines a substantially planar seat against which the first leg abuts when the locking head is disposed in its closed position.

3. A cable tie as claimed in claim 2, wherein the seat is orientated to be perpendicular or obtusely angled relative to a direction of rotation that the second leg will rotate around the hinge towards the locking head's open position.

4. A cable tie as claimed in claim 2, wherein the seat is enlarged so that a part of the closing wall extends partially into the passage when locking head is disposed in its closed position.

5. A cable tie as claimed in claim 1, wherein a part of the first leg is configured to be confined between the closing wall and the latching engagement formation.

6. A cable tie as claimed in claim 1, wherein the latching arm is configured to terminate flush with the first leg when the locking head is disposed in the closed position.

7. A cable tie as claimed in claim 1, wherein the locking head comprises a notch in the fixed leg, which notch is configured to extend around and partially beneath a terminal end of the latching arm, thereby in use being arranged to permit a person to lift the latching arm away from the first leg.

8. A cable tie as claimed in claim 1, wherein the latching engagement formation comprises a catch provided on the first leg and a latch provided on the latching arm, the catch and latch engaging along a latching engagement interface that extends along a plane that is orientated perpendicular or acutely angled relative to a direction of rotation that the second leg will rotate around the hinge towards the open position.

9. A cable tie as claimed in claim 8, wherein the catch comprises a slot extending transversely across an outer side of the first leg and the latch comprises a lug projecting inwardly from the latching arm, wherein the lug is configured to be received within the slot.

10. A cable tie as claimed in claim 8, wherein the latching engagement interface extends along a plane that is orientated to be perpendicular or acutely angled relative to a direction of rotation that the second leg will rotate around the hinge towards the open position.

11. A cable tie as claimed in claim 1, wherein the locking head comprises a second engagement formation being configured to limit any lateral sliding movement of the latching arm in a direction transverse to the hinge when locking head is disposed in its closed position.

12. A cable tie as claimed in claim 11, wherein the second engagement formation comprises a recess in the first leg and a peg extending from the latching arm for being received in the recess.

13. A cable tie as claimed in claim 12, wherein the strap comprises opposed elongated rails bordering the strap teeth wherein at least one of the rails is chamfered inwardly towards the strap teeth.

14. A cable tie as claimed in claim 13, wherein the pawl has a congruent chamfer to that of the chamfered rails.

* * * * *